March 4, 1941.  C. W. ROBERTS  2,234,062
SCENT DIFFUSER FOR COSTUME JEWELRY, HAIR
COMBS, AND LIKE ARTICLES
Filed May 25, 1940

INVENTOR
Charles W. Roberts
BY
ATTORNEY

Patented Mar. 4, 1941

2,234,062

UNITED STATES PATENT OFFICE 2,234,062

SCENT DIFFUSER FOR COSTUME JEWELRY, HAIR COMBS, AND LIKE ARTICLES

Charles W. Roberts, New York, N. Y.

Application May 25, 1940, Serial No. 337,196

8 Claims. (Cl. 63—1)

This invention relates to new and useful improvements in a scent diffuser for costume jewelry, hair combs and the like articles.

The invention has for an object the association of a scent diffuser on an inconspicuous point or area of costume jewelry, a comb, and the like article.

More specifically, the invention proposes to characterize the scent diffuser by the fact that it comprises a container for holding liquid scent material which is provided with a small discharge orifice through which the scent may emanate.

Still further the invention contemplates the arrangement of absorbent material directly behind the discharge orifice in a manner to prevent the liquid from spilling out while allowing the scent to pass.

Still further the invention contemplates a novel way of mounting the scent diffuser in position on the article.

Another object of the invention resides in so constructing the scent diffuser that it has a tendency of forcing scented air from the interior thereof.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
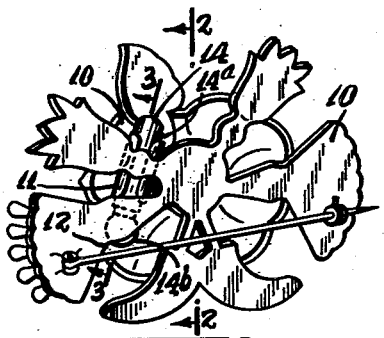
Fig. 1 is a perspective rear elevational view of a piece of jewelry provided with a scent diffuser constructed in accordance with this invention.

The scent diffuser, in accordance with this invention, includes a body 10 which may comprise a piece of costume jewelry, a comb or any other object. A clip 11 adapted to hold a cylindrical container is mounted on the body 10. A baffle 12 is mounted on the body 10 to the front of the clip 11. A cylindrical container 14 for scented liquid is mounted on the clip 11 and has a front discharge orifice 15 immediately adjacent the baffle 12.

The clip 11 comprises a C-shaped sheet of material which is attached at its center to the body 10. The cylindrical container 14 is forced in between the arms of the C-shaped clip. The cylindrical container 11 has a body section $14^a$ into which scented liquid may be placed. It is also provided with a removable tip $14^b$. This tip is threadedly mounted on the outer end of the body $14^a$. The tip $14^b$ is of hollow construction, and its interior is stuffed with cotton 16 or other absorbent material. The orifice 15 is located in the outer end of the tip $14^b$.

Figure 3:
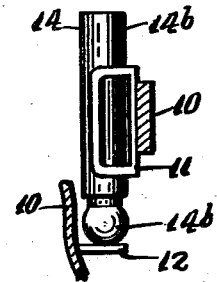
Fig. 3 is a fragmentary vertical sectional view taken on the line 3—3 of Fig. 1.
Figure 5:
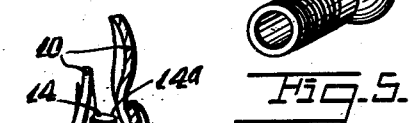
Fig. 5 is a perspective view of the tip of the scent container.
Figure 2:
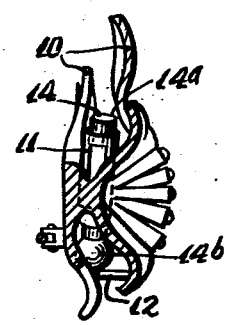
Fig. 2 is a vertical sectional view taken on the line 2—2 of Fig. 1.
Figure 4:
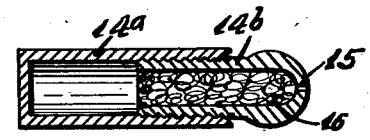
Fig. 4 is a longitudinal sectional view of the scent container per se.
Figure 6:
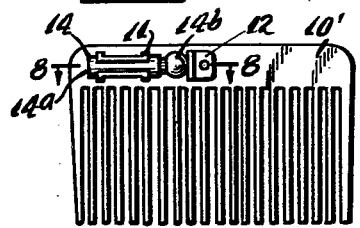
Fig. 6 is a rear elevational view of a comb provided with a scent diffuser constructed in accordance with another embodiment of the invention.
Figure 8:
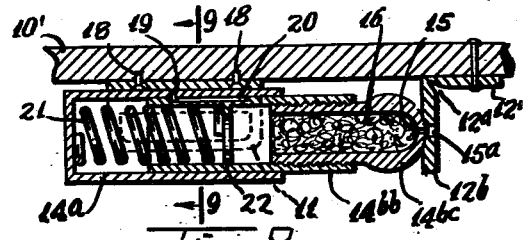
Fig. 8 is a fragmentary enlarged horizontal sectional view taken on the line 8—8 of Fig. 6.
Figure 7:
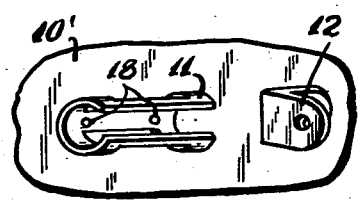
Fig. 7 is a fragmentary perspective view of a portion of Fig. 6 illustrating the comb with the scent container removed.
Figure 9:
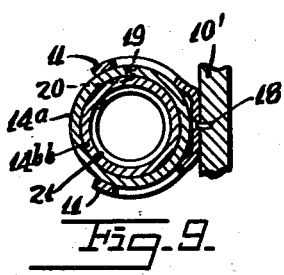
Fig. 9 is a fragmentary vertical sectional view taken on the line 9—9 of Fig. 8.

The operation of the device is as follows:

The scented liquid will moisten the cotton or other absorbent material 16, and the scented air will work its way out of the orifice 15 into the atmosphere. The baffle 12 forms an obstruction to limit the amount of scented air which leaves the scent diffuser. It is possible to place the cylindrical container 14 upon the clip 11 so that the orifice 15 is at various distances from the baffle 12. It may be in intimate contact, as illustrated in Fig. 3, or slightly spaced therefrom depending upon the degree of perfumed air desired.

In Figs. 6–9 inclusive, another form of the invention is disclosed which distinguishes from the prior form in several respects. The scent diffuser has been shown applied to a hair comb 10'. The clip 11 has been shown secured to the body 10' by fastening elements 18. The baffle 12' comprises an angle shaped piece of metal which has a recessed or scored area $12^a$ between the arms thereof so that the projecting arm $12^b$ thereof is very flexible. The tubular member $14^{bb}$ is slidably mounted in the outer end of the container body $14^a$.

A pin 19 is mounted upon one of these parts and engages a slot 20 in the other of the parts to limit the relative movements thereof to sliding only. An expansion spring 21 acts between the container body $14^a$ and the tubular member $14^{bb}$ to normally urge the member $14^{bb}$ outwards. A flange 22 is formed on the inside diameter of the member $14^{bb}$ against which the outer end of the spring 21 engages. A tip $14^{bc}$ is threadedly engaged in the outer end of the tubular member 14bb. This tip 14bc is provided with the orifice 15. It is also hollow and provided with the absorbent material 16. The tip 14bc is engaged against the baffle 12b under the resilient action of the spring 21.

When the article 10' is worn, vibrations due to walking or moving about will cause the tubular member 14bb to vibrate back and forth a slight distance in the container body 14a, because of the resilient action of the spring 21 and baffle 12b. These vibrations of the member 14bb will function to pump air in and out of the orifice 15. The orifice 15 is aligned with an opening 15a formed in the baffle 12b. The atmosphere in the vicinity of the diffuser will thus be scented.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle.

2. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, said body comprising the body of said jewelry or other article.

3. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, said clip comprising a sheet metal piece bent into C-shape with the arms thereof engaging said cylindrical container.

4. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, said cylindrical container comprising a container body into which scented liquid may be placed, and a tip mounted on the outer end of said body.

5. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, said cylindrical container comprising a container body into which scented liquid may be placed, and a tip mounted on the outer end of aid body, said tip having said orifice.

6. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, said cylindrical container comprising a container body into which scented liquid may be placed, and a tip mounted on the outer end of said body, said tip having said orifice, said tip being hollow, and absorbent material being placed in said hollow tip.

7. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, and comprising a body section with a closed rear end, a tubular member slidably mounted in the front end of said body section, a tip fixedly mounted upon the outer end of said tubular member and provided with said orifice, resilient means acting between said body and tubular member for resiliently urging the tubular member outwards, and said baffle being of resilient material flexibly opposing the resilient action of said resilient means.

8. A scent diffuser for costume jewelry and the like articles, comprising a body, a clip for holding a cylindrical container mounted on said body, a baffle mounted on said body to the front of said clip, and a cylindrical container for scented liquid mounted on said clip and having a front discharge orifice immediately adjacent said baffle, and comprising a body section with a closed rear end, a tubular member slidably mounted in the front end of said body section, a tip fixedly mounted upon the outer end of said tubular member and provided with said orifice, resilient means acting between said body and tubular member for resiliently urging the tubular member outwards, and said baffle being of resilient material flexibly opposing the resilient action of said resilient means, and means for limiting relative movements of said body section and tubular member to longitudinal sliding.

CHARLES W. ROBERTS.